United States Patent
Fixter et al.

(10) Patent No.: US 10,443,573 B2
(45) Date of Patent: Oct. 15, 2019

(54) WIND TURBINE HAVING A REDUCED RADAR CROSS SECTION

(71) Applicant: QINETIQ LIMITED, Farnborough, Hampshire (GB)

(72) Inventors: Greg Peter Wade Fixter, Hook (GB); Christopher Douglas James Spooner, Bracknell (GB); Christopher James Perry, Yateley (GB); Vincent Savage, Malvern (GB)

(73) Assignee: QINETIQ LIMITED, Hampshire (GB)

( * ) Notice: Subject to any disclaimer, the term of this patent is extended or adjusted under 35 U.S.C. 154(b) by 203 days.

(21) Appl. No.: 14/903,403

(22) PCT Filed: Jul. 30, 2014

(86) PCT No.: PCT/EP2014/066358
§ 371 (c)(1),
(2) Date: Jan. 7, 2016

(87) PCT Pub. No.: WO2015/014885
PCT Pub. Date: Feb. 5, 2015

(65) Prior Publication Data
US 2016/0153428 A1    Jun. 2, 2016

(30) Foreign Application Priority Data

Jul. 30, 2013 (GB) .................... 1313616.3

(51) Int. Cl.
*F03D 13/20* (2016.01)
*F03D 80/80* (2016.01)
(Continued)

(52) U.S. Cl.
CPC .......... *F03D 13/20* (2016.05); *F03D 1/0675* (2013.01); *F03D 80/80* (2016.05); *H01Q 17/00* (2013.01);
(Continued)

(58) Field of Classification Search
CPC .......... F03D 1/0675; F03D 9/25; F03D 13/20; F03D 80/80; F05B 2230/31;
(Continued)

(56) References Cited

U.S. PATENT DOCUMENTS

| 2010/0166547 A1* | 7/2010 | Presz, Jr. .................. F03D 1/04 415/200 |
| 2010/0231434 A1 | 9/2010 | Pinto et al. |
| 2013/0135135 A1 | 5/2013 | Appleton |

FOREIGN PATENT DOCUMENTS

| EP | 2081046 A1 | 7/2009 |
| EP | 2412525 A1 | 2/2012 |

(Continued)

OTHER PUBLICATIONS

Nov. 4, 2014 International Search Report issued in International Patent Application No. PCT/EP2014/066358.

(Continued)

*Primary Examiner* — Jason D Shanske
*Assistant Examiner* — Sang K Kim
(74) *Attorney, Agent, or Firm* — Kenealy Vaidya LLP (57) ABSTRACT

A wind turbine comprising a support structure and one or more turbine blades is disclosed, that incorporates means for reducing the radar cross section (RCS), wherein the support structure is notionally divided into an upper section in the shadow of the blade sweep area, and a lower section beneath the upper section, wherein the upper section is adapted to have the means for reducing the RCS, and the lower section does not have the said adaptation. The invention makes use of the realization that the blade masking the tower as it rotates (or the blade being masked by the tower if facing away from a radar), contributes significantly to interference (Continued)

to radar systems, and so localized application of e.g. RAM can give good RCS reduction at a lower cost than treating the whole structure.

15 Claims, 6 Drawing Sheets

(51) Int. Cl.
    *H01Q 17/00*     (2006.01)
    *F03D 1/06*     (2006.01)
    *E04H 12/02*     (2006.01)

(52) U.S. Cl.
    CPC .......... *E04H 12/02* (2013.01); *F05B 2230/31* (2013.01); *F05B 2260/99* (2013.01); *Y02E 10/721* (2013.01); *Y02E 10/728* (2013.01); *Y02P 70/523* (2015.11)

(58) Field of Classification Search
    CPC ..... F05B 2260/99; H01Q 17/00; E04H 12/02; Y02P 70/523; Y02E 10/721; Y02E 10/728
    See application file for complete search history.

(56) References Cited

FOREIGN PATENT DOCUMENTS

| | | |
|---|---|---|
| GB | 2465018 A | 5/2010 |
| WO | 2010/122352 A2 | 10/2010 |
| WO | 2011/051687 A2 | 5/2011 |
| WO | 2011/138597 A2 | 11/2011 |

OTHER PUBLICATIONS

Nov. 4, 2014 Written Opinion of the International Searching Authority issued in International Patent Application No. PCT/EP2014/066358.
Mar. 7, 2014 Search Report issued in British Patent Application No. 1313616.3.
Hamel et al., "Design of a stealth wind turbine," 2012 Loughborough Antennas & Propagation Conference, IEEE, Nov. 12, 2012, pp. 1-4.
Pinto et al., "Stealth technology for wind turbines," IET Radar, Sonar and Navigation, vol. 4, No. 1, 2010, pp. 126-133.

\* cited by examiner

WIND TURBINE HAVING A REDUCED RADAR CROSS SECTION

BACKGROUND OF THE INVENTION

Field of the Invention

The present invention relates to wind turbines, and to towers used to hold wind turbines. More particularly, it relates to towers and treatments to such towers, in the form of tiles, coatings, covers, etc. that have an effect on the reflectivity of electromagnetic (EM) waves used in radars and the like from such towers.

Description of Related Art

Wind turbines are increasingly being used for power generation, as a replacement for traditional coal and gas power generation, in an attempt to meet national and international carbon emissions targets. The turbines are generally very large, and act as significant reflectors of energy from radar systems, including ATC (Air Traffic Control) radars and ADR (Air Defence Radar), and weather radars. For this reason new wind farm proposals often face opposition due to the negative effects they may have upon such radar systems. The above radars generally employ Doppler processing of their return signals, meaning that they look for frequency changes in the returns caused by target movement. Turbine blades, being moving components, have particular impact upon such Doppler radars. This can confuse Doppler radars either into thinking there are relevant moving targets (e.g. aircraft) present when there aren't, or can mask actual targets from detection. Measures have been taken to mitigate the effects that wind turbines have upon radar systems. For example, WO2011/051687 and WO2010/122352 disclose techniques for minimising the EM reflection from the blades by incorporating EM absorbers, RAM (radiation absorbent material) or the like within them. Such measures can be very effective, depending upon the performance of the RAM used.

Reflectivity specifications for wind turbines can be difficult to meet, while keeping costs within reasonable bounds.

BRIEF SUMMARY OF THE INVENTION

According to a first aspect of the present invention there is provided a wind turbine comprising at least a support structure and one or more turbine blades, wherein the support structure is notionally divided into an upper section and a lower section, the upper section comprising approximately that part of the support structure having overlap with the turbine blade's sweep area, and a lower portion being the remaining part of the support structure below it, characterised in that a substantial part of the upper section is adapted to have a reduced radar cross section (RCS), and wherein the lower section does not have a substantial part so adapted.

Note that the overlapped region of the support structure may be that overlap region as seen by a remotely located radar, which will typically have a zero or very low angle of elevation in relation to the horizontal plane.

It is known that turbine blades interfere with Doppler radar systems, as has been noted above. It has hitherto been thought that the support structure, although having a significant radar cross section (RCS), had a much reduced effect on Doppler radars as it does not move, and hence does not create a Doppler shift. It is also very expensive to coat the tower in RAM. For these reasons, the tower has generally been ignored when considering the effect of the overall turbine on a Doppler radar. However, the present inventors have found that even though the tower is static, it can still act in concert with the moving turbine blades to produce a dynamic return to a radar system within range. This is so even if the blades of the turbine have been manufactured so as to have a reduced RCS using e.g. the techniques proposed in the patent documents referenced above.

The effect of the tower on Doppler radars has been found to be primarily due to the periodic masking of a part of the tower by the turbine blades, as they sweep past the tower, leading to a discontinuity in the phase and/or magnitude of the reflection, which in turn leads to a spreading of the Doppler spectrum. An RCS peak has been found to occur at this point, which dominates the total time averaged RCS from the turbine. This can be much more significant and potentially disruptive to Doppler radar systems than the steady (but often sizeable) reflection from the remaining part of the tower.

The effect has been found to be most pronounced when, in turbines having a horizontal axis of rotation, the nose of the nacelle holding the blades is pointing in the direction of a radar of interest, i.e. when the axis of rotation of the blades is pointing in azimuth towards the radar (and therefore when the azimuthal angle=0 degrees). This is because this position leads to a more sudden change in the magnitude of the reflection from the tower, as the blade sweeps down past the upper section of the tower. However, the effect is also significant, but to a lesser degree, for small (e.g. less than approx. 45°) azimuth angles either side of this. There is also an effect when the axis of rotation is pointing at approximately 180° from the radar, i.e. when the nose of the nacelle is pointing substantially directly away from the direction of the radar, and for small azimuth angles either side of this.

The adaptation to reduce the RCS may comprise coating the relevant part of the tower with a means for absorbing radiation, such as a RAM, for example a circuit analogue RAM, or may comprise physical shaping to direct EM radiation away from the direction from which it came, or away from a given direction of interest. A combination of both shaping and RAM coverage may be used.

The parts of the upper section adapted to reduce RCS may, in some embodiments, be the whole length of the upper section, for at least a part of its circumference but positive effects will be obtained if the majority of the length of upper section is so adapted. The adapted parts may comprise the whole circumference, or may alternatively comprise just a part of the circumference. The adaptation may differ along the length of the upper section, so that different sub-lengths have different adaptations, e.g. differing amounts of RAM coverage. Given the location of a known radar of interest (i.e. a radar that may be affected by the turbine), then only a portion of the upper section may be adapted to reduce RCS, the portion being that facing towards the radar location, for the reason explained above. A RAM covering may be provided over a circumferential region of between 20° and 90° either side of a point facing the radar, with the remainder left uncovered. This therefore allows significant cost savings compared to covering even just the upper section of the tower. However, in situations e.g. where the radar may be relocated, or may be located on a moving vehicle, such as an aircraft coming from any azimuth, then substantially the whole circumference of the upper section of the tower may be covered in RAM. Such a complete covering of the upper section may be employed more generally if the cost and weight implications are not prohibitive. Alternatively, the upper section may be divided into sub-sections, with a given sub-section having a different covering compared to another sub-section. For example, different sub-sections may have different circumferential coverings, or have a plurality of sectors within the sub-section with different coverings on each.

Embodiments of the invention may have substantially the whole length of the upper section adapted to reduce RCS for at least a portion of its circumference, and may have substantially none of the length of the lower section so adapted. Other embodiments may have substantially the whole length of the upper section having a RAM covering over at least a portion of its circumference, with substantially none of the length of the lower portion having such a RAM covering, but wherein at least a portion of the lower section may be shaped to reduce reflections towards an associated radar.

The RAM may comprise of RAM tiles, which are glued to the appropriate parts of the tower. The RAM may be a circuit analogue (CA) RAM, which has printed resistive tracks of a size, resistivity and separation from an associated ground plane, chosen to be absorptive to wavelengths of interest. For most radars, this wavelength would be around 15 cm to 1 cm, with Doppler weather radars, for example, typically operating in the range of 1 GHz to 10 GHz (30 cm to 3 cm, maximising the Rayleigh back-scatter from the raindrops. The RAM tiles may be similar in regard to their general electrical performance to those disclosed in the above referenced patent applications, and of course may be tailored to specific requirements in known fashion. The tiles preferably have a degree of flexibility to enable them to be attached to the typically curved surface of the support structure. However, to add a degree of stiffness to make them suitable for use in this application, they may be have a substrate layer of glass fibre. This helps to reduce flexing of the tiles to acceptable levels, and so reduces cracking of any printed electrical tracks forming the CA components.

Note that in this application a significant part of the tower, in relation to the coverage of the RCS reducing treatment, means that the application has a significant effect on the RCS for a given wind turbine and radar arrangement. It does not necessarily have to be substantial in terms of area of coverage (e.g. it may not, in some embodiments cover a majority of the area of the upper section of the tower), but may be so on some embodiments.

Note also that the upper section of the support structure may alternatively be defined as being that part of it that goes into shadow of an illuminating radar as a turbine blade sweeps past it. If the illuminating radar is at a different altitude to the support structure, such as at the bottom of a hill on which the support structure is located, (or vice versa), or is located in an aircraft illuminating the support structure from a high altitude, then this alternative definition may lead to a small variation in the proportion of the support structure's height that is in the upper section. In practice however, the differences are likely to be very small, and thus of little consequence to the implementation of the invention.

The support structure comprises primarily a supporting tower, but may also include a nacelle that contains the turbine itself, and also the mechanical attachment for the turbine blades.

Although the invention is described herein with relation to wind turbines having a horizontal axis of rotation (i.e. "HAWTs", or horizontal axis wind turbines), it will be appreciated also that the invention is also applicable to those having a vertical axis of rotation also (VAWTs, or vertical axis wind turbines) where there is some (but not total) overlap between the sweep area of the turbine blade and the support structure.

According to a second aspect of the present invention there is provided a method of treating a wind turbine support structure comprising:
i) identifying an upper section of the support structure, the upper section being that top part having overlap with the sweep area of a blade of the turbine, with the remainder of the support structure below it being a lower section
ii) identifying a region on the side of the support structure facing a radar of interest
iii) adapting at least a significant part of the circumference of the upper section of the support structure to reduce its radar cross section (RCS), with the significant part including a substantial part of the region identified in (ii); and
iv) arranging the lower part of the support structure to not have a substantial region adapted to reduce its RCS.

The method may be applied to existing wind turbine support structures, or to newly built ones.

Any feature in one aspect of the invention may be applied to other aspects of the invention, in any appropriate combination. In particular, method aspects may be applied to apparatus aspects, and vice versa.

BRIEF DESCRIPTION OF THE DRAWINGS

Embodiments of the invention will now be described, by way of example only, with reference to the following Figures, of which.

DETAILED DESCRIPTION OF EMBODIMENTS

Figure 1:
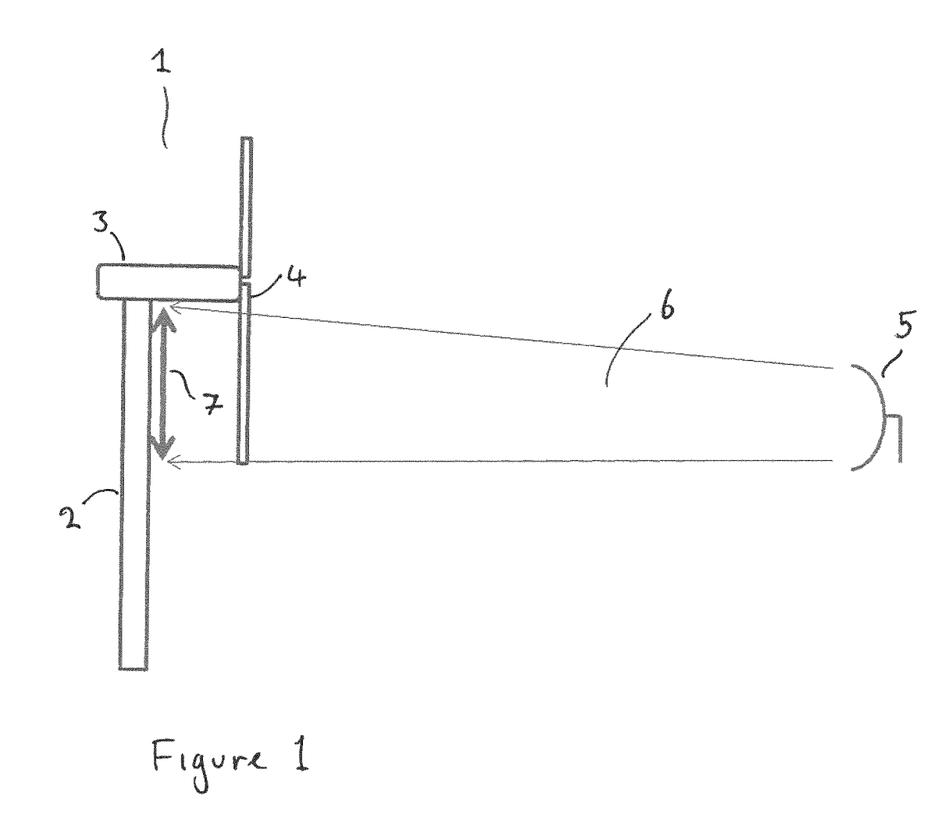
FIG. 1 diagrammatically illustrates a wind turbine upon which embodiments of the current invention may be implemented.

FIG. 1 shows a representation of a wind turbine (1) in profile view, comprising a support tower (2), nacelle (3) and turbine blades (4). The diagram is not shown to scale, and in practice the tower would generally be longer than shown, in relation to the length of the blades. The blades (4) rotate about their rotational axis and hence each blade, at the bottom of its rotation, lines up with the tower (2).

A radar (5) is shown illuminating the turbine (1) with EM radiation, with that part of its illumination of general interest to the current invention shown (6). The EM radiation (6) hits the tower (2) and blades (4), and reflects back, and is received by the radar (5) and subsequently processed in known manner. For most of the rotational period of the turbine the blades are not obscuring any significant area of the tower. However, when a blade reaches its nadir then it is in line with the tower, and provides maximum obscuration of part of the tower. The lower blade (4) is shown in this position, and it can be seen to be obscuring the upper part of the tower marked by arrow (7) from the radar (5). Thus the section shown by the arrow (7) is the upper section of the tower, while that part of the tower below it is the lower section. It can be seen that the upper section is approximately equal to the length of a single blade (4).

Figure 2:
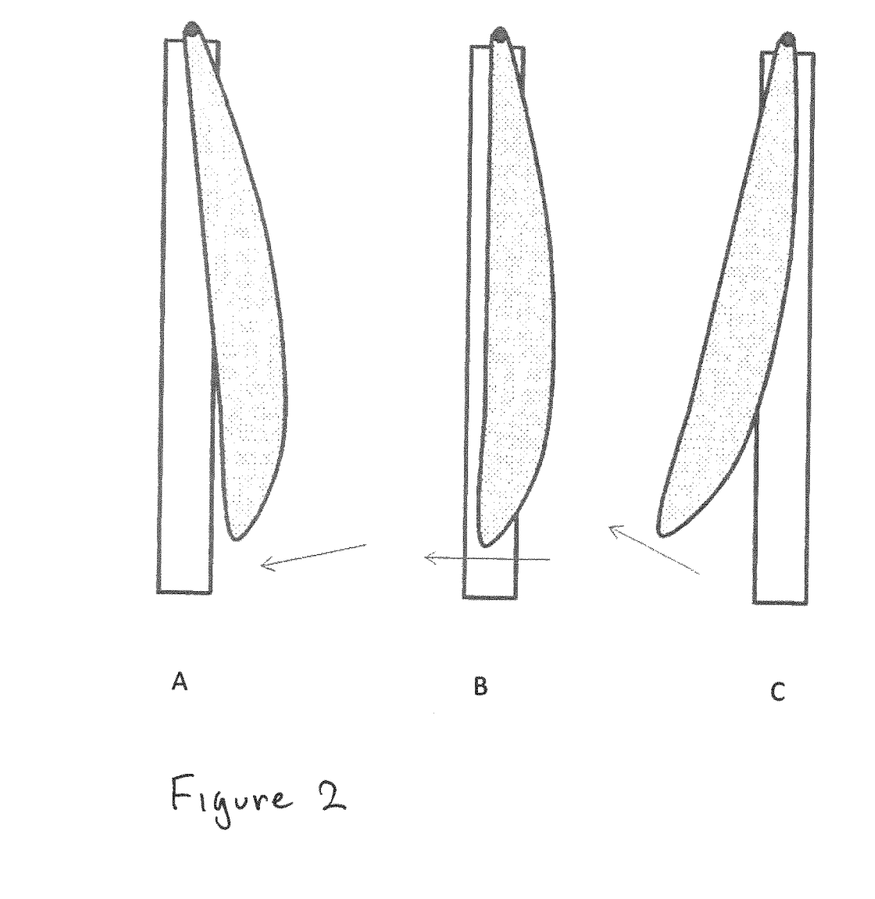
FIG. 2 diagrammatically illustrates various blade positions of a turbine which lead to the problem addressed by the present invention.

FIG. 2 shows in more detail the obscuration process as the blade rotates. FIG. 2a shows a blade (4) rotating about a fulcrum (8), and moving in the direction shown by the arrow. It is approaching its lowest point. Tower (2) is partially obscured, mainly in the upper left part, by the leading edge of the blade, but as the blade sweeps round further, the amount of obscuration will increase quickly.

FIG. 2b shows the blade (4) in its lowest part, and at a point at, or very close to, maximum obscuration of the tower, dependent upon the exact shape of the blade and the angle from which the blade and tower are being observed. The amount of blade movement between FIGS. 2a and 2b is slight, but the additional obscuration of the tower is significant. Thus the obscuration tends to appear, to a radar, as a sudden transition with a discontinuous reflection phase and/or magnitude. In normal operating conditions the transition occurs sufficiently quickly to show as a large Doppler velocity change, which can lead to the radar giving a false measurement or detection.

FIG. 2c shows the blade moving away from the lowest point, and starting to reveal the previously obscured tower once more, as the blade's trailing edge moves around. The shape of the blade's trailing edge may differ from the leading edge, resulting in a reveal of the tower at a different apparent pace to that of its obscuration. This can compound the problem this causes to the Doppler radar signal processing.

Figure 3:
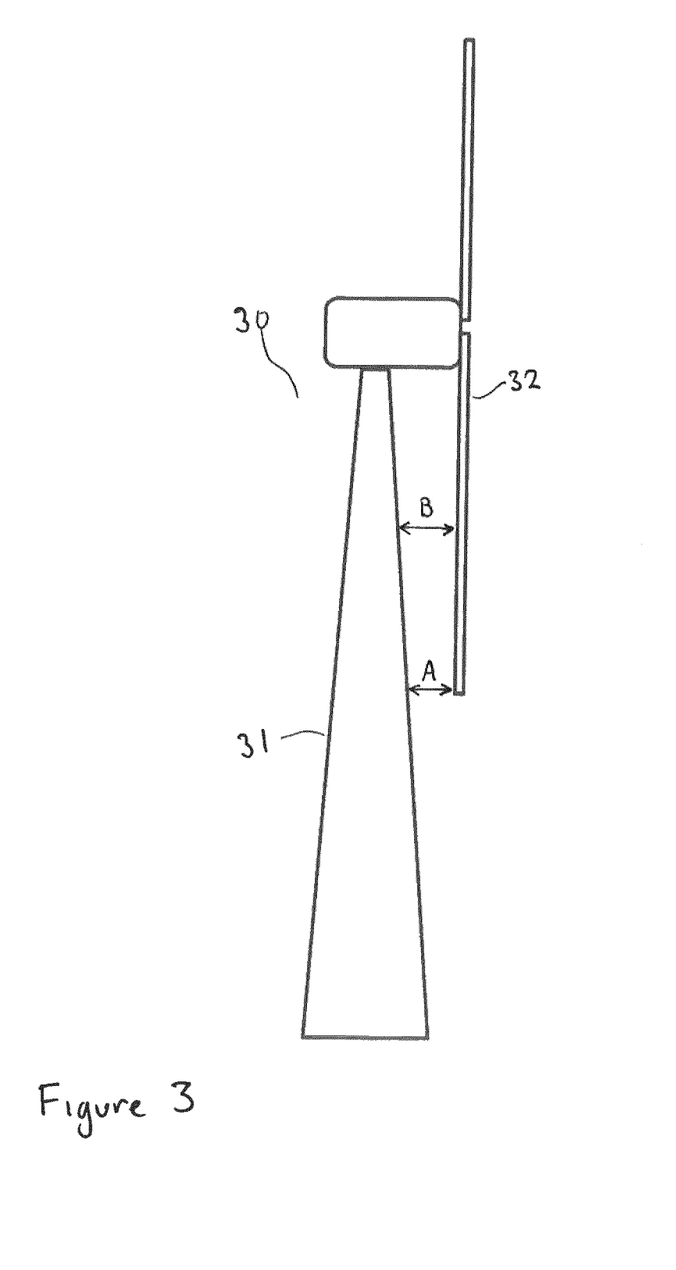
FIG. 3 diagrammatically illustrates a wind turbine having a minimum separation between its blade and tower that varies along the length of the blade.
Figure 4:
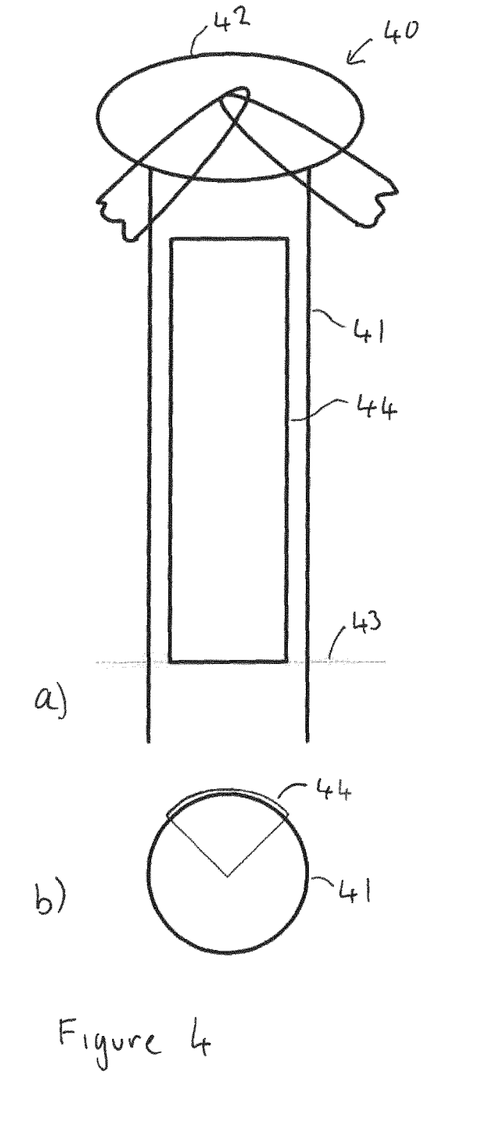
FIGS. 4-9 diagrammatically illustrate various embodiment of the present invention.

FIG. 3 shows a type of wind turbine that can create additional RCS peaks due to the relative shaping of the blades and the support tower. Here, wind turbine (30) has a tower (31) that tapers inwards from its base to its top. A blade (32) is shown positioned at its lowest point. It can be seen that the horizontal separation between the blade and the tower varies along the length of the blade. For example, the separation at the blade tip is shown at A, and the separation at the middle of the blade shown at B.

Thus, as the blade (32) sweeps past the tower as it moves through its nadir, as well as the sudden transition effect described with relation to FIG. 2, there is also a more gradual (but still rapid) apparent change in the average distance of the upper section of the tower as would be perceived by a Doppler radar. This effect can produce the unwelcome RCS peak effects in such radars.

Prior to this invention, the effects described above were not realised by those working in the field. Therefore, their solution was to cover all, or a significant part of the whole of the tower in some sort or RAM or equivalent, to prevent reflected radiation from interfering with radar systems. The realisation of the cause has enabled a much lower cost option of highly selective RAM placement just where it has the most benefit.

FIGS. 4 to 8 show various embodiments of the invention wherein a selected part of the upper section of the support structure is treated to reduce reflections back to an associated radar system. In all figures the upper section is that part lying above the dotted line (43).

With regards to FIG. 4a, a part of a wind turbine (40) is shown, including the uppermost part of the tower (41) and nacelle and blades (42). Located on the tower is a patch of RAM (44) that stretches from the bottom of the upper section to almost the top of the tower. The RAM (44) covers a 90° sector of the tower's circumference, as indicated at (44) in the cross section view at FIG. 4b. The RAM (44) is chosen to be absorbent to radiation emitted by an associated radar system. The location of the radar system is generally known, particularly if it is a fixed, ground based radar. In such circumstances, the RAM is positioned on the tower so that the horizontal centre of the RAM faces the radar's location. This gives RAM coverage up to 45° each side of "boresight" direction, to cover instances where the nacelle is not pointing straight at the radar location.

Figure 5:
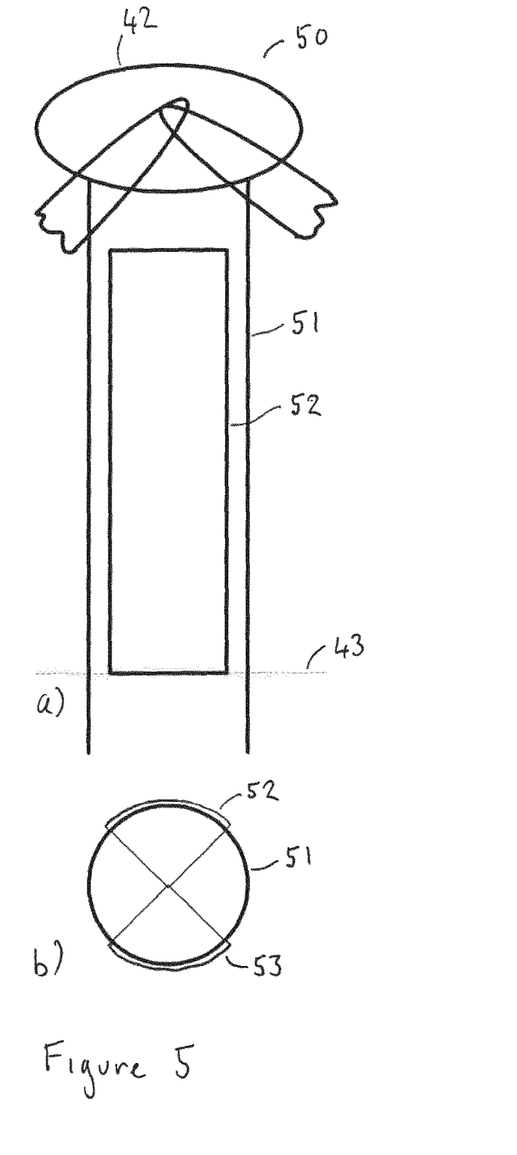

FIG. 5 shows another embodiment of the invention having different treatments to reduce the RCS of the upper section. FIG. 5a shows a similar wind turbine (50) and its support structure (51), having a partial RAM coating (52) on the "front" (i.e. the region facing towards a known radar position), as in FIG. 4. However, as is evident from the cross-sectional view at FIG. 5b, as well as the front RAM coating (52), there is also a rear coating (53) of similar size, and on an opposing side of the tower (51). This rear coating is present to attenuate radar returns when the turbine nacelle (42) is facing away from the radar, and hence when there exists a significant possibility for multipath reflections from the blades 54 and the rear of the tower (51).

FIG. 6a shows an embodiment wherein, within the upper region of a wind turbine support structure (60), the support structure has two differing RAM covering regimes. A first length of the support structure (60), denoted x has a 90° RAM covering (61) on the front of the tower, as is shown by reference to the cross section of that first length at FIG. 6b. A second length of the support structure (60), denoted y, has a 45° RAM covering (62), as shown in the cross-section view of the second length at FIG. 6c. Thus the amount of RAM coating (or indeed any other technique used to reduce reflections back to the radar) can be tailored according to the measured or predicted effects of particular parts of the support structure. Here, the design reflects the result of such predictions or measurements that a lower Doppler return will emanate from the second length, and hence a smaller, and hence cheaper, region of the tower needs to be treated with the RAM coating.

Figure 6:
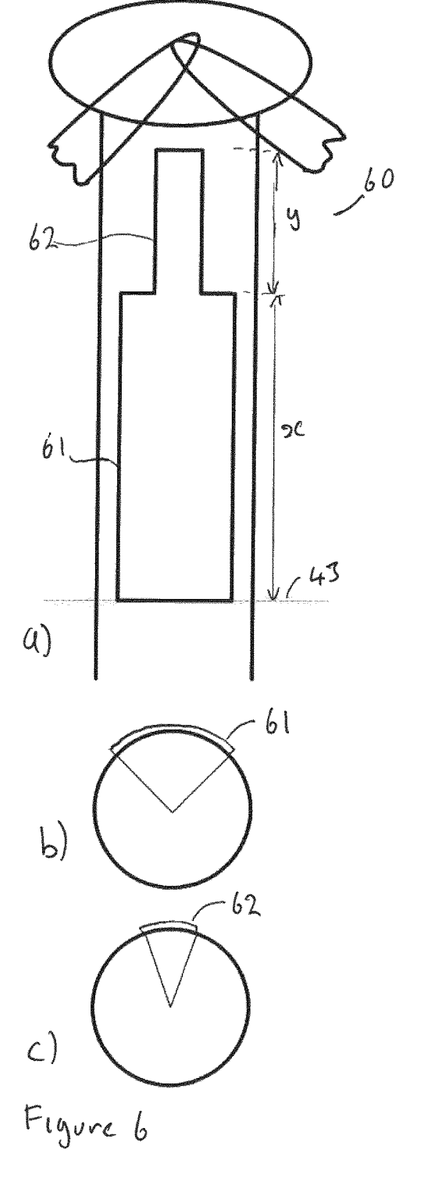
Figure 7:
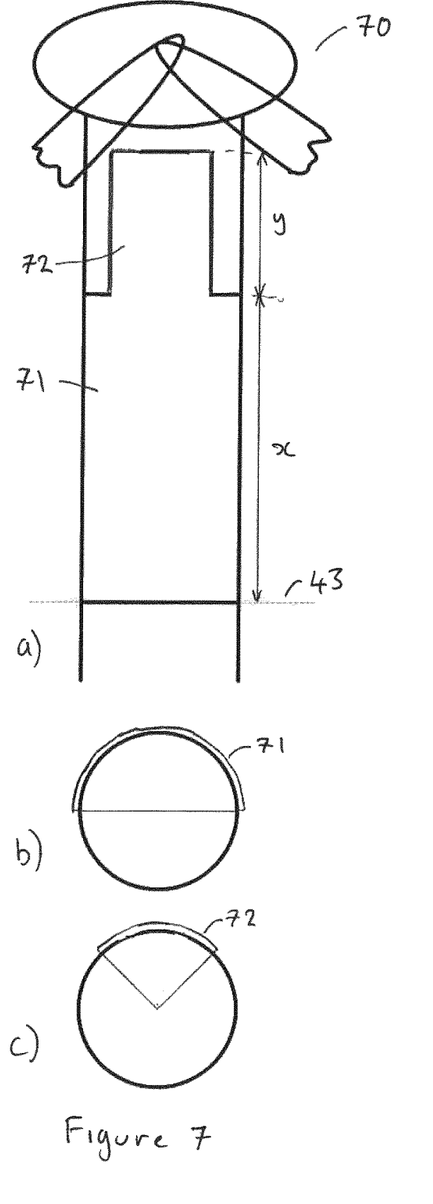

FIG. 7 shows an embodiment of the invention similar to that of FIG. 6, but having a different RAM coverage pattern. FIG. 7a shows the front view of the turbine unit (70). A first length (x) has a RAM coating (71) covering a 180° span, whereas a second length (y) has a 90° angular coverage of RAM coating (72). FIG. 7b shows in cross section the coverage for the first length (x) with RAM coating (71) attached to a front facing part of the tower structure, while FIG. 7c shows in cross section the coverage for the second length (y).

Figure 8:
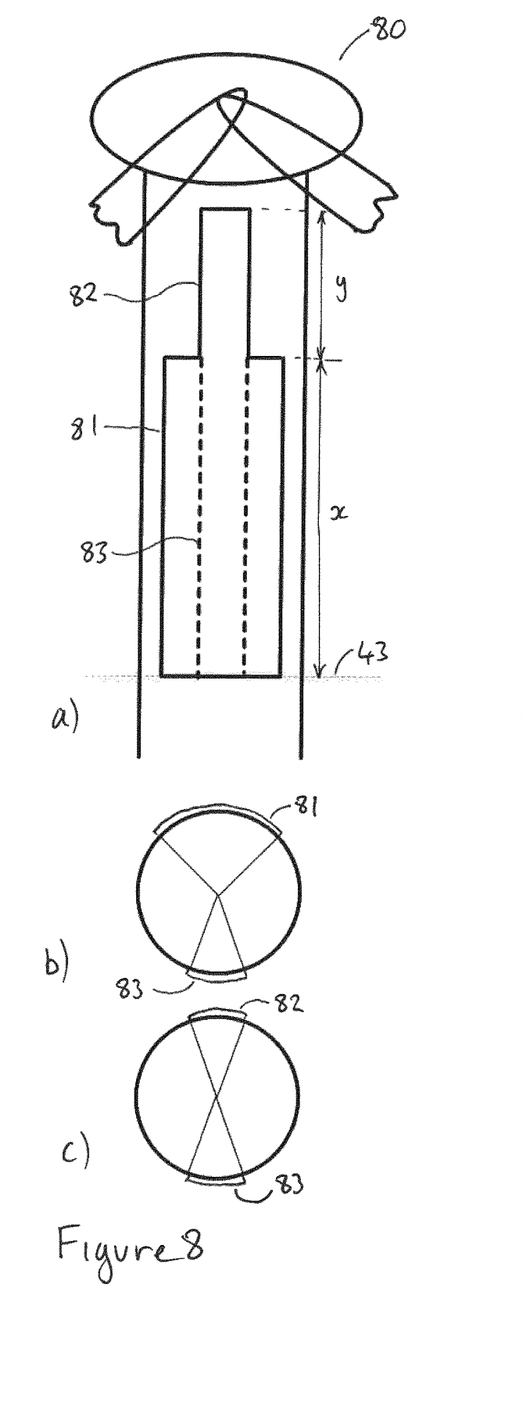

FIG. 8 shows an embodiment of the invention having both a front and rear coating of RAM, with differing coverage along the length on the front face. FIG. 8a shows the front view of a wind turbine (80). On the front face of the turbine (80) a first length (x) has a RAM coating (81) covering a 90° span, whereas a second length (y) has a 45° angular coverage of RAM (82) coating the side of the tower. On the rear face of the turbine (80) is a strip of RAM (83) of a width that provides a 45° coating running the length of the upper section. FIGS. 8b and 8c show cross sectional views of the tower for the first length (x) and a second length (y) respectively, with the sectorial RAM coverage of the lengths indicated.

Figure 9:
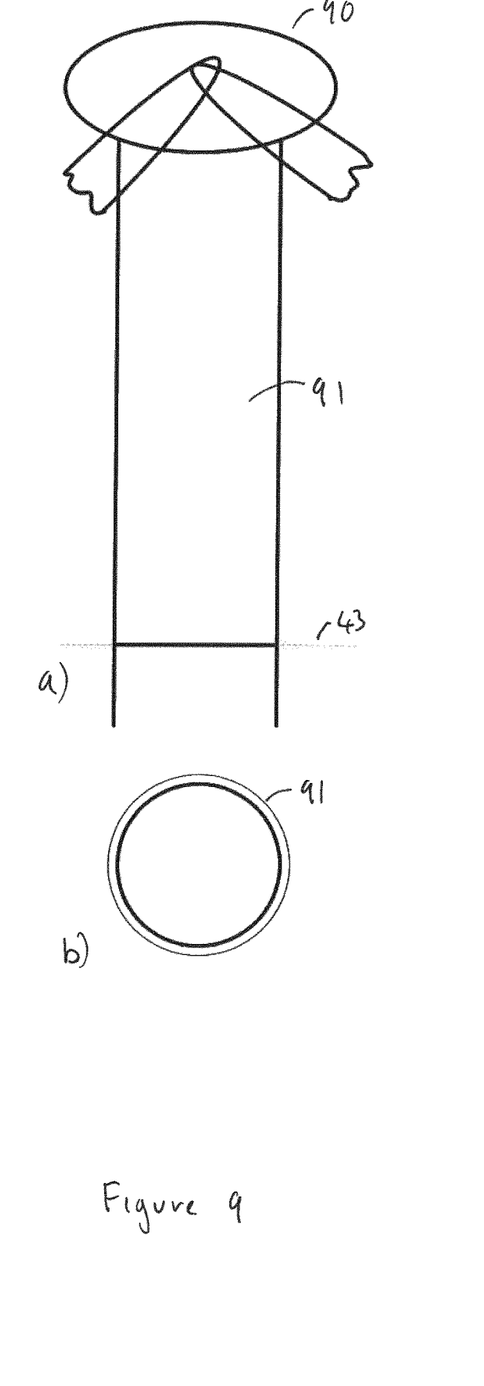

FIG. 9a shows an embodiment of the invention wherein a turbine (90) has a RAM coating (91) covering substantially all of the upper section of its support structure, on both the front and back. This provides maximum attenuation of radiation that impinges upon the upper section, but also has the largest coverage area (and hence cost) and weight. FIG. 9b shows a cross-sectional view of the upper section, where it can be seen that the RAM coating (91) covers the whole circumference.

The invention has been described primarily with relation to the commonplace HAWT version of the wind turbine. The normally skilled person will appreciate that various modifications and alterations may be applied to the embodiments described without deviating from the spirit and scope of the invention, including adapting the patterning and area coverage of any anti-reflection coatings (including RAM), shaping to reduce reflections in any given direction, and use of the invention on VAWT systems.

The invention claimed is:

1. A wind turbine comprising:
a support structure; and
one or more turbine blades, each of the one or more turbine blades having a tip at an end thereof, the tip being at a lowest point when the turbine blade reaches its nadir upon aligning with the support structure,
wherein the support structure is notionally divided, by the lowest point of the tip of a turbine blade of the one or more turbine blades, into an upper section and a lower section, the upper section including a part of the support structure that overlaps with the turbine blades' sweep area, and the lower section being a remaining part of the support structure below the upper section, wherein a portion spanning from approximately 45° to less than 180° of a circumference of certain cross-sections of the upper section is adapted to have a reduced radar cross section (RCS), and with substantially none of the length of the lower section having a reduced radar cross section (RCS).

2. The wind turbine as claimed in claim 1, wherein the portion of the upper section is covered with radiation absorbent material (RAM).

3. The wind turbine as claimed in claim 2, wherein the RAM is adapted to be absorbent at wavelengths transmitted by an associated radar system.

4. The wind turbine as claimed in claim 1, wherein the portion includes two opposing sections relative to the circumference of the upper section that each span approximately 45°.

5. The wind turbine as claimed in claim 1, wherein, given a predetermined location of a radar in relation to the support structure, the portion faces the radar and is covered in RAM.

6. The wind turbine as claimed in claim 5, wherein angular coverage of the portion covered with RAM extends to between approximately 20° to 90° either side of a point on the circumference facing the radar.

7. The wind turbine as claimed in claim 6, wherein the angular coverage is approximately 45° either side of the point facing the radar.

8. The wind turbine as claimed in claim 5, wherein a region on the upper side of the support structure opposite to the side facing the radar also has a RAM coating applied thereto.

9. The wind turbine as claimed in claim 1, wherein the upper section is itself divided into a plurality of sub-sections or sub-regions, wherein a given sub-section or sub-region has a different covering of RAM as compared to another.

10. The wind turbine as claimed in claim 1, wherein substantially ½ of the upper section has a RAM covering.

11. The wind turbine as claimed in claim 1, wherein the RAM comprises a plurality of tiles, each comprising a multi-layered circuit analogue structure.

12. The wind turbine as claimed in claim 11, wherein the tiles have a substrate layer comprising glass fibre.

13. The wind turbine as claimed in claim 1, wherein the upper section of the support structure is shaped so as to avoid reflection of radio frequency electromagnetic (EM) energy in a direction of interest.

14. A wind turbine comprising:
a support structure; and
one or more turbine blades, each of the one or more turbine blades having a tip at an end thereof, the tip being at a lowest point when the turbine blade reaches its nadir upon aligning with the support structure,
wherein the support structure is notionally divided, by the lowest point of the tip of a turbine blade of the one or more turbine blades, into an upper section and a lower section, the upper section including a part of the support structure that goes into shadow of an illuminating radar as a turbine blade sweeps past the support structure, and the lower section being a remaining part of the support structure below the upper section, wherein a portion spanning from approximately 45° to less than 180° of a circumference of certain cross-sections of the upper section is adapted to have a reduced cross radar section (RCS), and with substantially none of the length of the lower section having a reduced radar cross section (RCS).

15. A method of treating a support structure of a wind turbine, the wind turbine including a blade, the blade having a tip at an end thereof, the tip being at a lowest point when the blade reaches its nadir upon aligning with the support structure, the support structure being notionally divided by the lowest point of the tip into an upper section and a lower section, the method comprising:
i) identifying the upper section of the support structure, the upper section being a top part having overlap with a sweep area of the blade of the wind turbine, with a remainder of the support structure below it being the lower section;
ii) identifying a region on a side of the support structure facing a region of interest;
iii) adapting at least a portion spanning from approximately 45° to less than 180° of a circumference of certain cross-sections of the upper section of the support structure to reduce its radar cross section (RCS), with the portion including a substantial part of the region defined in (ii); and
iv) arranging the lower part of the support structure such that substantially none of the length thereof is adapted to reduce its RCS.

* * * * *